United States Patent [19]

Kuroda et al.

[11] Patent Number: 5,703,854
[45] Date of Patent: Dec. 30, 1997

[54] DISC RECORDING/REPRODUCTION APPARATUS AND METHOD FOR RESETTING AN ADDRESS CONTROL CIRCUIT TO MAXIMIZE AN ADDRESS MARGIN OF THE MEMORY

[75] Inventors: Hirokazu Kuroda; Ryo Ando, both of Tokyo, Japan

[73] Assignee: Sony Corporation, Tokyo, Japan

[21] Appl. No.: 493,368

[22] Filed: Jun. 21, 1995

[30] Foreign Application Priority Data

Jun. 29, 1994 [JP] Japan ................. 6-170026

[51] Int. Cl.⁶ .................................. G11B 7/00
[52] U.S. Cl. .......................... 369/50; 369/54
[58] Field of Search .................. 369/47–48, 50, 369/54, 59, 124

[56] References Cited

U.S. PATENT DOCUMENTS 4,620,300  10/1986  Ogawa ........................ 369/47 X
5,054,014  10/1991  Ito et al.

OTHER PUBLICATIONS

Patent Abstracts of Japan, vol. 13, No. 144, E740, & JP 63-306,788, Apr. 10, 1989.
Patent Abstracts of Japan, vol. 14, No. 317, P1073, & JP 2-101,676, Jul. 9, 1990.
Patent Abstracts of Japan, vol. 18, No. 159, P1711, & JP 5-325,403, Mar. 16, 1994.
Patent Abstracts of Japan, vol. 7, No. 202, P221, & JP 58-100,206, Sep. 7, 1983.

*Primary Examiner*—W. R. Young
*Attorney, Agent, or Firm*—Limbach & Limbach L.L.P.

[57] ABSTRACT

A spindle servo circuit controls the rotation of a disc-driving spindle motor based on absolute address information taken from a disc. Reproduction digital data is written to and read from a RAM. An address control circuit generates a write address of the RAM by counting clocks synchronized with the reproduction digital data by a first counter, and generates a read address of the RAM by counting reference clocks by a second counter. A jitter correction circuit produces jitter-removed reproduction digital data from the RAM. The address control circuit is reset so that the address margin of the RAM is maximized when the spindle servo circuit is locked.

14 Claims, 6 Drawing Sheets

FIG. 4

| ITEM | CONTENT |
| --- | --- |
| ANALOG MODULATION | FM |
| CARRIER WAVE FREQUENCY | 22.05kHz |
| DIGITAL MODULATION | BIPHASE-MARK |
| DATA BIT RATE | 3150 BITS/SEC |
| SECTOR LENGTH | 42 BITS |
| SECTOR FREQUENCY | 75 Hz |
| DATA | 3 BYTES |
| ERROR PROTECTION | 14-BIT CRC |

DISC RECORDING/REPRODUCTION APPARATUS AND METHOD FOR RESETTING AN ADDRESS CONTROL CIRCUIT TO MAXIMIZE AN ADDRESS MARGIN OF THE MEMORY

BACKGROUND OF THE INVENTION

1. Field of the Invention

The present invention relates to a disc recording/reproduction apparatus which records, for instance, an audio signal after converting it to digital data and reproduces recorded data.

2. Description of the Related Art

Recently, a portable audio recording/reproduction apparatus using a small-sized magneto-optical disc (mini disc; MD) as a recording medium has been proposed by the present assignee and is now on the market. This portable audio recording/reproduction apparatus is expected to become personal audio equipment of the next generation to replace the compact cassette player because of its advantages of not only compactness and recordability (advantages of a compact cassette) but also high sound quality and quick random access (advantages of a compact disc (CD)).

This disc recording/reproduction apparatus also corresponds to an apparatus using a reproduction-only optical disc on which audio data is recorded in the form of physical pits as in the case of a CD. In this disc recording/reproduction apparatus, the data recording modulation scheme is EFM (eight-to-fourteen modulation) as in the case of a CD player.

For tracking control, spiral pregrooves (guide grooves) are formed in advance on a recordable magneto-optical disc. The pregrooves are recorded by frequency modulation based on absolute address data covering all the tracks of the disc. Thus, the pregrooves of a magneto-optical disc wobble in the disc radial direction in accordance with the absolute address data.

In the above recording/reproduction apparatus, during recording and reproducing operations on a recordable magneto-optical disc, the disc is rotation-driven so as to rotate at a constant linear velocity (CLV) by detecting a wobbling component from the pregrooves and servo-controlling the rotation of a spindle motor so that the wobbling component has a constant frequency (hereinafter called "spindle servo"). Absolute address information (ADIP; address in pregroove) over all the tracks of the disc is obtained by frequency-modulating the wobbling component.

The CLV spindle servo technique is disclosed, for instance, in Japanese Examined Patent Publication No. Hei. 3-711 (corresponding to Unexamined Publication No. Sho. 58-100206). The present assignee has also proposed techniques relating to the disc rotation control apparatus of this invention in Japanese Patent Application No. Hei. 4-130986 (filed May 22, 1992; a corresponding U.S. patent application is now pending), U.S. Pat. Nos. 4,620,300 (patented Oct. 28, 1986) and 5,054,014 (patented Oct. 1, 1991). Each of the above applications and patents is owned by the present assignee and hereby incorporated by reference.

In the above-described disc recording/reproduction apparatus, during reproduction of the disc, a deviation (jitters) in the time-axis direction of a reproduction signal (EFM data) is corrected by using a random access memory (RAM). As in the case of the CD reproduction apparatus, the memory is controlled by using a signal that is generated based on a reproduction clock signal having the same jitters as reproduction EFM data and a jitter-free reference clock signal that is sent from a clock generation circuit incorporated in the apparatus.

In this case, the reproduction clock signal is generated in synchronism with the frames of the EFM data. The maximum jitter amount that can be corrected by use of the memory, i.e., the memory capacity is set for unit EFM data corresponding to the frame period.

In the CD reproduction apparatus, the spindle servo is performed based on a reproduction clock signal and a reference clock signal, and the phase of the reproduction clock signal can be approximated to that of the reference clock signal within a range of the frame period of the EFM data multiplied by a predetermined number.

A servo circuit in which the jitter margin is increased with the capacity of a jitter correction memory kept small is disclosed, for instance, in Japanese Unexamined Patent Publication No. Hei. 2-101676 filed by the present assignee.

However, during reproduction of a recordable magneto-optical disc, as described above, the spindle servo is performed based on the wobbling component reproduced from the pregrooves. Therefore, when locking (phase-locking) is obtained in the spindle servo of the disc recording/reproduction apparatus, the phase difference between the reproduction clock signal and the reference clock signal is not always approximated to the zero-frame state; that is, the approximation may be attained with a positive or negative shift of an integer multiple of the frame period. As such, the maximum jitter margin is not always assured.

Assume a case shown in FIG. 6 where the capacity of a jitter correction memory is 8 frames and the minimum value Amn and the maximum value Amx of the memory address correspond to ±4 frames of the phase difference between the reproduction clock signal and the reference clock signal. When approximation is attained at point P in FIG. 6 with a phase difference between the two clock signals of +3 frames, the phase margin in the positive direction is only one frame. Thus, in terms of the memory, the phase margin means the address margin.

In the example of FIG. 6, the maximum address margin is obtained when the phase difference between the reproduction clock signal and the reference clock signal is approximated to the zero-frame state that corresponds to the center value Act of the RAM address.

SUMMARY OF THE INVENTION

An object of the present invention is to provide a disc recording/reproduction apparatus in which the maximum address margin can be obtained when the spindle servo reaches locking during reproduction of a recordable magneto-optical disc.

To attain the above object, according to the invention, there is provided a disc recording/reproduction apparatus for recording and reproducing data onto and from a disc on which control information is written in advance, comprising a spindle servo circuit for controlling, based on the control information taken from the disc, rotation of a spindle motor that drives the disc; a memory to and from which reproduction digital data is written and read; an address control circuit for generating a write address of the memory by counting clocks synchronized with the reproduction digital data by a first counter, and for generating a read address of the memory by counting reference clocks by a second counter; a jitter correction circuit for producing jitter-removed reproduction digital data from the memory; and reset means for resetting the address control circuit so as to maximize an address margin of the memory when the spindle servo circuit changes from an unlocked state to a locked state.

With the above constitution, when the spindle servo circuit is locked during reproduction of the recordable disc, the address control circuit of the memory of the jitter correction circuit that is independent of the spindle servo circuit is reset. As a result, the address margin of the jitter correction memory is maximized and the jitter correction is thereby performed stably.

BRIEF DESCRIPTION OF THE DRAWINGS

FIG. 4 shows particulars relating to the absolute address information;

DETAILED DESCRIPTION OF THE PREFERRED EMBODIMENT

A disc recording/reproduction apparatus according to an embodiment of the present invention will be described with reference to FIGS. 1–5. Before the invention itself, a recording/reproduction apparatus to which the invention is applied will be described.

Configuration of Recording/Reproduction Apparatus

Figure 2:
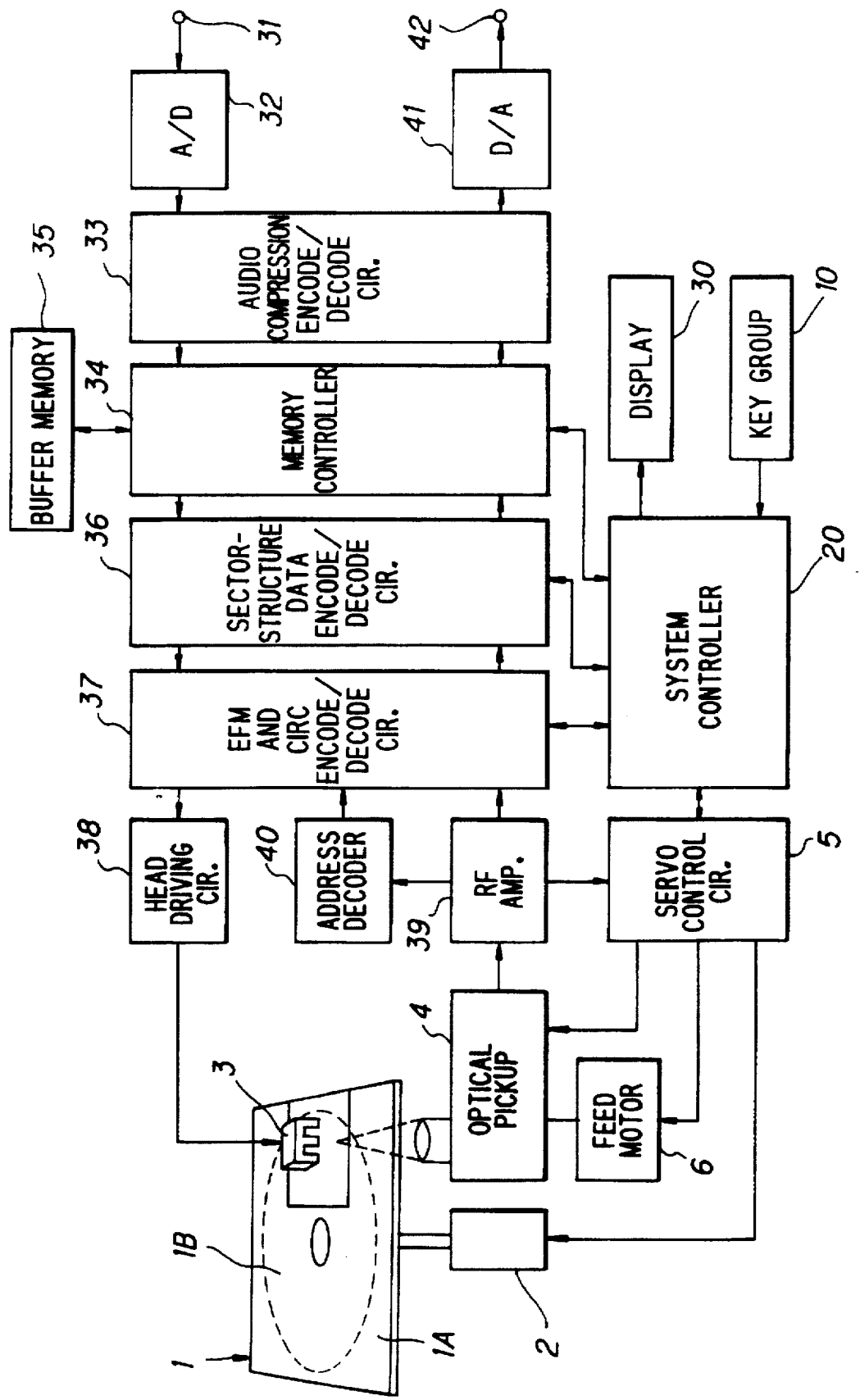
FIG. 2 is a block diagram showing the entire configuration of the disc recording/reproduction apparatus according to the embodiment of the invention.

FIG. 2 shows a configuration of an optical disc recording/reproduction apparatus to which the invention is applied. In FIG. 2, a disc cartridge 1 incorporates a 64-mm-diameter optical disc 1B in a cartridge main body 1A. The optical disc 1B may be one of three types of discs, i.e., a reproduction-only optical disc, a recordable magneto-optical disc, and a hybrid disc having reproduction-only regions and recordable regions in a mixed form. The following description of the embodiment will be directed to a case where the optical disc 1B is a magneto-optical disc.

Spiral pregrooves for light beam tracking control are formed in advance on the optical disc 1B. Particularly in this example, the pregrooves are recorded by frequency modulation based on absolute address data. Therefore, the pregrooves of the optical disc 1B wobble in the radial direction of the optical disc 1B in accordance with the absolute address data.

The optical disc 1B is rotated by a spindle motor 2. The rotation of the spindle motor 2 is controlled by a servo control circuit 5 so that the disc 1B rotates at a constant linear velocity. The cartridge main body 1A is provided with a shutter. When the disc cartridge 1 is placed on a disc mounting tray and then introduced into the apparatus, the shutter is opened to expose the optical disc 1B to the outside through the opening portion of the cartridge main body 1A. When the disc cartridge 1 is discharged from the apparatus, the shutter in moved to the position of closing the opening portion of the cartridge main body 1A. A recording magnetic head 3 is opposed, from above, to the shutter opening portion of the disc main body 1A, and an optical pickup 4 is opposed, from below, to the shutter portion.

The optical pickup 4 is moved in the radial direction of the disc 1B by a feed motor 6. Further, the servo control circuit 5 performs focus control and tracking control of the optical pickup 4.

Constituted of a microcomputer, a system controller 20 manages the operation of the entire apparatus. The system controller 20 is supplied with key input signals from a key group 10. Although not shown in FIG. 2, the key group 10, which includes a power key, eject key, reproduction key, halt key, stop key, recording key, and fast-feed reproduction keys in the forward and backward directions, is provided on a front panel of the recording/reproduction apparatus.

The system controller 20 generates a control signal based on an operated key of the key group 10, and manages and controls the operation of the recording/reproduction apparatus by supplying the generated control signal to its respective parts.

Further, a display 30, which is constituted, for instance, of a LCD or fluorescent character display tubes, is connected to the system controller 20. The display 30 indicates time information such as a total playing time of the optical disc 1B being mounted, an elapsed time of a song being played, a remaining playing time of a song being reproduced, and a remaining playing time of the whole disc 1B, and a track number of a song being played. The display 30 also indicates a disc name and a track name when such information is recorded on the disc 1B. The display 30 further indicates a recording date and time of a song or the disc 1B when such information is recorded on the disc 1B.

The configuration of the recording and reproduction signal system of the embodiment of FIG. 2 is made as simple as possible by using ICs. The operation mode of the respective parts is switched in response to a mode switching signal sent from the system controller 20.

Recording System

Reference numeral 31 denotes an input terminal of an audio signal. (Although only one channel is shown in FIG. 2, 2-channel stereo signals are actually used. The same thing applies to the following description.) The audio signal is then digitized by an A/D converter 32 with a sampling frequency of 44.1 kHz and a quantization bit number of 16.

The resulting digital audio signal is supplied to an audio compression encode/decode circuit 33, where the audio signal is subjected to data compression to about ⅕. For example, modified discrete cosine transform (modified DCT) may be used as an audio signal compressing technique.

The audio signal as compressed by the audio signal compression encode/decode circuit 33 is sent, via a memory controller 34, to a buffer memory 35 and stored therein temporarily. The buffer memory 35 is controlled by the memory controller 34. In this embodiment, the buffer memory 35 is a DRAM having a data capacity of 4 Mbits.

If there occurs no track jump (skipping of the recording position on the optical disc 1B due to vibration or the like) during a recording operation, the memory controller 34 sequentially reads out the compressed data from the buffer memory 35 at a transfer rate about 5 times the writing rate, and transfers the readout data to a sector-structure data encode/decode circuit 36.

When a track jump is detected during a recording operation, the memory controller 34 suspends the data transfer to the data encode/decode circuit 38, and accumulates, in the buffer memory 35, compressed data sent from the audio compression encode/decode circuit 33. When the illuminating position of the light beam coming from the optical pickup 4, i.e., the recording position has been corrected, the memory controller 34 performs writing and reading control on the buffer memory 35 to restart the data transfer from the memory 35 to the data encode/decode circuit 36.

The occurrence of a track jump can be detected, for instance, by providing a vibration meter on the recording/ reproduction apparatus and judging whether the magnitude of vibration is one causing a track jump. Alternatively, the occurrence of a track jump can be detected by utilizing the absolute address data that is recorded on the disc 1B in the form of the pregrooves as described above. That is, the system controller 20 monitors the continuity of decoded address data by reading the absolute address data during a recording operation. As a further alternative, the occurrence of a track jump may be detected by ORing the output of the vibration meter and the absolute address data. At the occurrence of a track jump, the system controller 20 controls the optical pickup 4 so as to reduce the power of the light beam emitted from the optical pickup 4 to a level of disabling the magneto-optical recording or to make it zero.

At the occurrence of a track jump, the recording position is corrected by using the absolute address data mentioned above. As is understood from the above, the buffer memory 35 is required to have at least a data capacity that allows storage of compressed data corresponding to a period from the occurrence of a track jump to a time point when the correction of the recording position is completed. In this embodiment, as mentioned above, the buffer memory 35 has a capacity of 4 Mbits, which is so selected as to satisfy the above condition with a sufficient margin.

While a recording operation is performed normally, the memory controller 34 controls the buffer memory 35 so as to minimize the amount of data stored therein. That is, when the amount of data stored in the buffer memory 35 exceeds a prescribed amount, a certain amount of data, for instance, 32-sector data (1 sector is 1 CD-ROM sector (about 2 Kbytes)) is read out from the buffer memory 35, to always secure a writing space larger than a predetermined data amount.

The data encode/decode circuit 36 encodes the data as read out from the buffer memory 35 into data having the CD-ROM sector structure. As described later, the recording and reproduction of audio data are performed in units of 32 sectors, which corresponds to about 2 seconds in terms of the original analog audio signal and about 0.4 second after the data compression. The 32-sector audio data is hereinafter called a cluster.

The output data of the data encode/decode circuit 36 is supplied to an EFM and CIRC encode/decode circuit 37, which subjects the data to error detection/correction coding and modulation suitable for the recording, in this embodiment, the EFM (8-to-14 modulation).

In this embodiment, the error detection/correction code is an interleave-modified version of the CIRC (crossinterleave Reed-Solomon code) for the compact disc. The recording data are intermittent data. More specifically, 36-sector unit recording data is formed by adding a total of 4 cluster-linking sectors (hereinafter called "linking sectors"; including sub-data of one sector) before and after audio data of 32 sectors (one cluster).

The recording data formed in the above manner is supplied to the recording magnetic head 3 via a head driving circuit 38, and a magnetic field modulated in accordance with the recording data is applied to the disc (magneto-optical disc) 1B.

On the other hand, a laser beam emitted from the optical pickup 4 is also applied to the disc 1B. During a recording operation, a laser beam having a certain power that is higher than in a reproducing operation is applied to recording tracks. Data is thermomagnetically recorded onto the disc 1B by the light illumination and the application of a modulated magnetic field generated by the magnetic head 3. Thus, data corresponding to an approximately 2-second portion of an original audio signal (one cluster) is recorded onto the disc 1B in about 0.4 second.

The apparatus is so constructed as to allow the magnetic head 3 and the optical pickup 4 to move in the radial direction of the disc 1B in synchronism with each other.

Based on a detection output signal of a photodetector of the optical pickup 4, a RF amplifier 39 generates a RF signal, which is a reproduction signal from the optical disc 1B. Where the optical disc 1B is a magneto-optical disc, the RF amplifier 39 generates the RF signal based on a difference in the Kerr rotation angle of a light beam reflected from the recording film of the optical disc 1B. The RF signal is supplied to the EFM and CIRC encode/decode circuit 37.

From the output signal of the photodetector, the RF amplifier 39 generates a focus error signal according to what is called an astigmatism method, and a tracking error signal according to what is called a 3-spot method. Further, the RF amplifier 39 generates a pregroove-detecting signal, i.e., a push-pull signal according to what is called a push-pull method, and supplies it to an address decoder 40 (described later).

As described above, the thus-generated focus error signal and tracking error signal are input to the servo control circuit 5. The RF amplifier 39 extracts a clock component from the RF signal obtained from the pregrooves, and supplies it to the servo control circuit 5. The servo control circuit 5 generates a spindle servo signal by comparing the clock component with a reference clock signal, and supplies it to the spindle motor 2. Thus, the spindle motor 2 is so controlled as to rotation-drive the disc 1B at a constant linear velocity.

The address decoder 40 generates address data by frequency-demodulating the received push-pull signal. The address data obtained by demodulation by the address decoder 40 is supplied to the EFM and CIRC encoder/ decoder circuit 37 and decoded therein. The decoded address information is supplied to the system controller 20, where it is used for the recognition of a recording position and the position control. Similarly, the address information is used for the recognition of a reproducing position and the position control in a reproducing operation.

In the recording operation under discussion, the address data decoded by the EFM and CIRC encode/decode circuit 37 is inserted into the recording data and recorded onto the disc 1B.

Reproduction System

Next, a description will be made of the reproduction. During a reproducing operation, the spindle motor 2 is controlled in a manner similar to the case of the recording operation, i.e., controlled by the servo control circuit 5 based on a signal reproduced from the pregrooves so that the disc 1B rotates at the constant linear velocity as in the recording operation.

During the reproducing operation, as described above, by detecting the reflection light of the laser light applied to a target track, the optical pickup 4 detects a focus error according to the astigmatism method, and a tracking error according to the push-pull method. Further, the optical pickup 4 produces a reproduction RF signal by detecting a difference in the polarization angle (Kerr rotation angle) of the reflection light from a target track.

The output of the optical pickup 4 is supplied to the RF amplifier 39. The RF amplifier 39 not only extracts the focus error signal and the tracking error signal from the output of the optical pickup 4 and supplies those signals to the servo control circuit 5, but also binarizes the reproduction signal and supplies resulting binary data to the EFM and CIRC encode/decode circuit 37.

The servo control circuit 5 performs focus control on the optics of the optical pickup 4 so as to make the focus error signal zero, and performs tracking control on the optics of the optical pickup 4 so as to make the tracking error signal zero.

The output of the RF amplifier 39 is supplied to the address decoder 40, which extracts the absolute address data reproduced from the pregrooves and decodes it. The absolute address data is supplied from the decoder 40 via the circuit 37 to the system controller 20, and used for the reproducing position control in the disc radial direction of the optical pickup 4 which control is performed by the servo control circuit 5. Further, the system controller 20 can use the sector-unit address information extracted from the reproduction data, to manage the position on the recording tracks being scanned by the optical pickup 4.

As described later, during the reproducing operation, compressed data read out from the disc 1B is written to the buffer memory 35, and then read out therefrom and expanded. Since those two kinds data have different transfer rates, the data reading from the disc 1B by the optical pickup 4 is performed, for instance, intermittently so that the amount of data stored in the buffer memory 35 does not become smaller than a predetermined value.

In the EFM and CIRC encode/decode circuit 37, the signal received via the RF amplifier 39 is EFM-demodulated and then subjected to error correction. Further, having a jitter correction circuit as described later, the EFM and CIRC encode/decode circuit 37 removes jitters, which are time-axis errors included in the reproduction signal.

The output of the EFM and CIRC encode/decode circuit 37 is supplied to the sector-structure data encode/decode circuit 36, which decodes the data of the CD-ROM sector structure into the original data in a compressed state.

The output of the encode/decode circuit 36 is supplied to the buffer memory 35 via the memory controller 34 and stored therein temporarily. Without a track jump (i.e., skipping of the reproducing position due to vibration etc.), the memory controller 34 sequentially reads out, at a transfer rate about ⅓ of the writing rate, the data in a compressed state which is sent from the data encode/decode circuit 36, and transfers the readout data to the audio compression encode/decode circuit 33. In this operation, the memory controller 34 controls the writing and reading operations on the buffer memory 35 so that the amount of data stored in the buffer memory 35 does not become smaller than a predetermined value.

When a track jump is detected during a reproducing operation, the memory controller 34 suspends the data writing from the data encode/decode circuit 36 to the buffer memory 35 while effecting the data transfer to the audio compression encode/decode circuit 33. As soon as the illuminating position of the light beam emitted from the optical pickup 4, i.e., the reproducing position is corrected, the memory controller 34 controls the writing and reading operations on the buffer memory 35 so as to restart the data writing to the memory 35.

As described above, during a normal reproducing operation, the memory controller 34 controls the buffer memory 35 so as to minimize periods during which the amount of data stored in the memory 35 is smaller than the predetermined amount of data that is larger than the minimum necessary amount. For example, when the amount of data stored in the buffer memory 35 becomes smaller than the predetermined amount, the memory controller 34 sends a control signal to the system controller 20 so that data is intermittently read out from the disc 1B by the optical pickup 4 and written to the memory 35 from the data encode/decode circuit 36, to thereby secure the amount of data larger than the predetermined value in the memory 35.

The time required to fill up the buffer memory 35 with data is about 0.9 second, which corresponds to about 3 seconds in terms of the analog audio signal. That is, even in the event that a signal cannot be read out from the disc 1B when the buffer memory 35 is full of data, the reproduction signal output can be continued for about 3 seconds. Discontinuity in the reproduced sound can be avoided by causing the optical pickup 4 to re-access the original position and restarting the signal reading in such a period.

The digital data expanded by the audio compression encode/decode circuit 33 is supplied to the D/A converter 41, where it is restored to an analog signal. The resulting analog signal is output from an output terminal 42.

Constitution of the Main Part of the Invention

Figure 1:
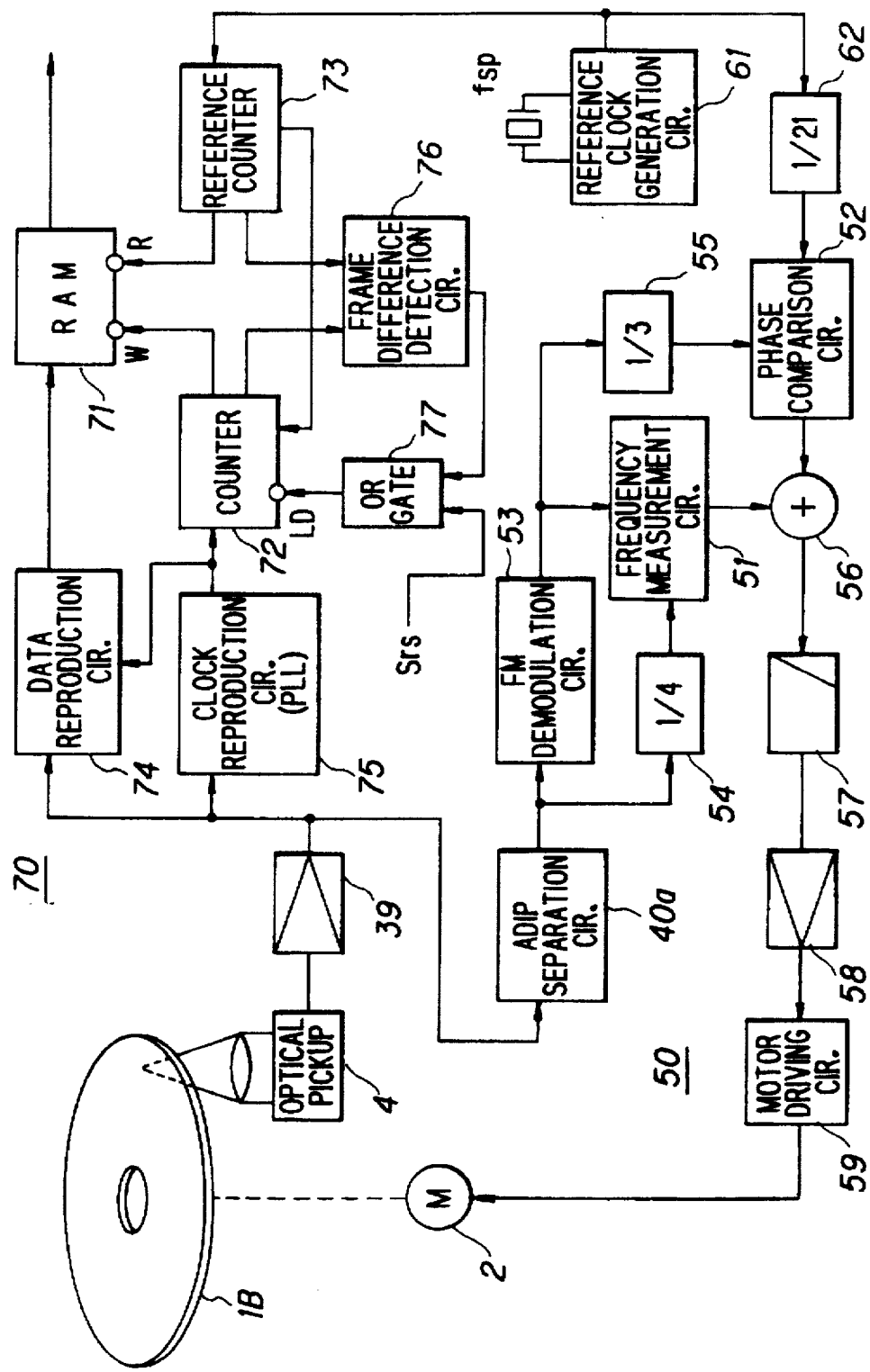
FIG. 1 is a block diagram showing a configuration of the main part of a disc recording/reproduction apparatus according to an embodiment of the present invention.

FIG. 1 shows a configuration of the main part of an embodiment of the invention. The parts in FIG. 1 corresponding to those in FIG. 2 are given the same reference numerals and redundant descriptions therefor will be omitted.

A spindle servo circuit 50 and a jitter correction circuit 70 in FIG. 1 correspond to a portion of the servo control circuit 5 and a portion of the EFM and CIRC encode/decode circuit 37 in FIG. 2, respectively.

The spindle servo circuit 50 includes a frequency measurement circuit 51, a phase comparison circuit 52 and a FM demodulation circuit 53. An ADIP signal separated from an output of a RF amplifier 39 by an ADIP separation circuit 40a, which corresponds to a portion of the address decoder 40 in FIG. 2, is commonly supplied to the FM demodulation circuit 53 and a ¼ frequency division circuit 54. Outputs of the circuits 53 and 54 are supplied to the frequency measurement circuit 51 while the output of the FM demodulation circuit 53 is supplied to the phase comparison circuit 52 via a ⅓ frequency division circuit 55.

The phase comparison circuit 52 is supplied with an output of a reference clock generation circuit 61 via a 1.21 frequency division circuit 62. The reference clock signal generation circuit 61 generates a clock signal having a sampling frequency fsp of 44.1 kHz as described above.

Outputs of the frequency measurement circuit 51 and the phase comparison circuit 52 are added together by an addition circuit 56, and an addition result is supplied to a motor driving circuit 59 via a lowpass filter 57 and an amplifier 58. An output of the driving circuit 59 is supplied to a spindle motor 2.

The jitter correction circuit 70 includes a RAM 71 and a pair of counters 72 and 73 for controlling reading and writing operations on the RAM 71.

The output of the RF amplifier 39 is commonly supplied to a data reproduction circuit 74 and a clock reproduction circuit 75. The clock reproduction circuit 75, which is constituted of a PLL circuit, produces a clock signal having the same time-axis errors (jitters) as the reproduction data. The output of the clock reproduction circuit 75 is supplied to not only the data reproduction circuit 74 but also the clock terminal of the counter 72 for generating a write address for the RAM 71.

The reference clock signal generated by the reference clock generation circuit 61 (for instance, a quartz oscillator) and including no time-axis errors is supplied to the clock terminal of the counter 73, which generates a read address for the RAM 71.

An output of the data reproduction circuit 74 is supplied to the RAM 71, and outputs of the counters 72 and 73 are supplied to the write address control terminal and the read address control terminal of the RAM 71, respectively.

Further, the outputs of the counters 72 and 73 are supplied to a frame difference detection circuit 76, and its output is supplied, as a load signal, to the load terminal of the counter 72 via an OR gate 77. The load terminal of the counter 72 is also supplied, via the OR gate 77 as a load signal, with a reset signal Srs that is sent from the system controller 20 (see FIG. 2). The output of the counter 73 is supplied to the load value input terminal of the counter 72.

Operation of the Main Part of the Embodiment

The operation of the embodiment of the invention will be described with reference to FIGS. 3–5.

Figure 3:
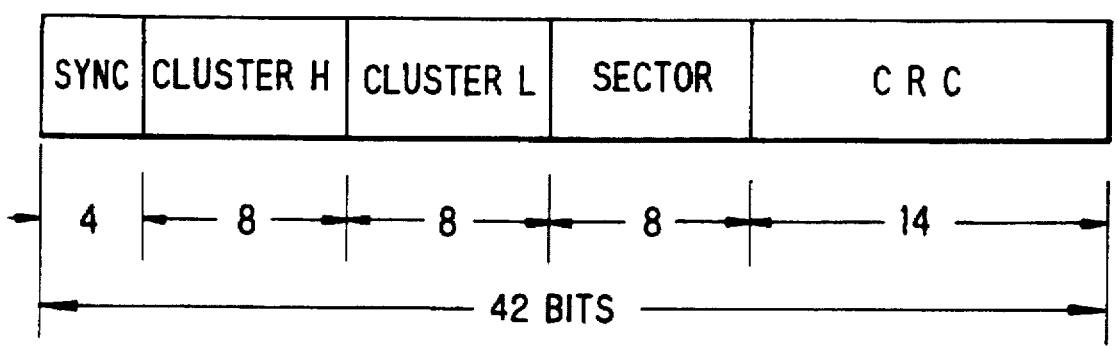
FIG. 3 shows a structure of absolute address information.

As shown in FIG. 3, the absolute address information ADIP over all the tracks of the recordable magneto-optical disc 1B consists of 42 bits in total: 4 bits for sync bits, 8 bits (1 byte) for each of three kinds of data, i.e., cluster H and cluster L that together constitute cluster address data, and 14 bits for error correction CRC. The particulars relating to the absolute address information ADIP are shown in FIG. 4.

In the embodiment of FIG. 1, a reproduction ADIP signal that is output from the ADIP separation circuit 40a and a demodulation ADIP signal that is output from the FM demodulation circuit 53 are supplied to the frequency measurement circuit 51. Based on an output of the frequency measurement circuit 51, two-step servo control is performed on the spindle motor 2 under the control of the system controller 20 of FIG. 2.

Spindle Servo during Reproduction

Figure 5:
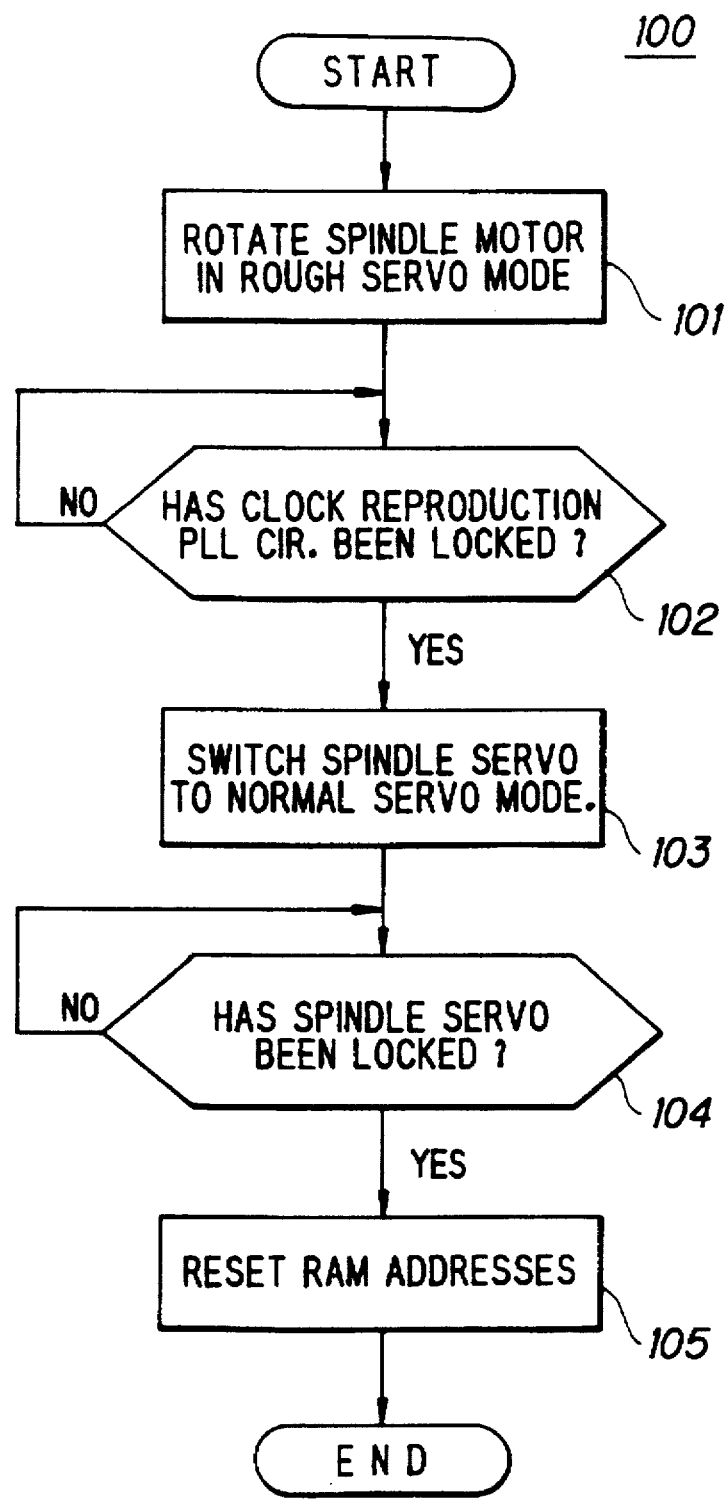
FIG. 5 is a flowchart showing the operation of the disc recording/reproduction apparatus according to the embodiment of the invention.

When the recording/reproduction apparatus is started in a reproduction mode upon depression of the reproduction key among the key group 10 of FIG. 2, routine 100 shown in FIG. 5 is executed. First, in step 101, the spindle motor 2 is driven in a rough servo mode for rough speed adjustment.

In the rough servo mode, for instance the pulse width of a PWM drive signal that is supplied from the driving circuit 59 to the spindle motor 2 is so controlled that the carrier wave frequency of the reproduction ADIP signal that is supplied from the frequency measurement circuit 51 via the frequency division circuit 54 becomes 22.05 kHz. Thus, an EFM clock signal that is separated from the reproduction signal sent from the RF amplifier 39 is caused to fall within the capture range of the PLL circuit of the clock reproduction circuit 75.

In step 102, it is judged whether the PLL circuit of the clock reproduction circuit 75 has been locked. This judgment is made based on, for instance, whether the CRC check of ADIP has produced two consecutive results indicating a correct operation.

If it is confirmed that the PLL circuit of the clock reproduction circuit has been locked, the process goes to step 103, where the spindle servo is switched to a normal servo mode. In the normal servo mode, the pulse width of the PWM drive signal that is supplied from the driving circuit 59 to the spindle motor 2 is so controlled that the frequency of the demodulation ADIP signal that is sent from the FM demodulation circuit 53 becomes 6.3 kHz.

The phase comparison circuit 52 performs phase comparison between the frequency-divided demodulation ADIP signal of 2.1 kHz (output of the ⅓ frequency division circuit 55) and the frequency-divided reference clock signal of 2.1 kHz (output of the 1/21 frequency division circuit 62). Based on an output of the phase comparison circuit 52, phase servo is performed on the spindle motor 2.

In step 104, it is judged whether the spindle servo has been locked. If it is confirmed that the spindle servo has been locked, for instance, based on the fact that the CRC check of ADIP has produced two consecutive results indicating a correct operation (in the same manner as in the above judgment), the process goes to step 105. In step 105, as described later, the addresses of the RAM 71 are reset in response to the reset signal Srs sent from the system controller 20 (see FIG. 2).

That is, in response to the reset signal Srs sent from the system controller 20, the count value of the read address generation counter 73 is loaded into the write address generation counter 72. As a result, the write address and the read address become identical and the RAM 71 has the maximum address margin.

RAM Management during Reproduction

As described above, in the jitter correction circuit 70, the clock reproduction circuit 75 generates the reproduction clock signal that is synchronized with the frames of the reproduction signal (EFM data). The reproduction clocks are counted by the counter 72, and its count value is input to the write address control terminal of the RAM 71 as the write address.

The counter 73 counts the reference clocks sent from the reference clock generation circuit 61, and its count value is input to the read address control terminal of the RAM 71 as the read address.

Figure 6:
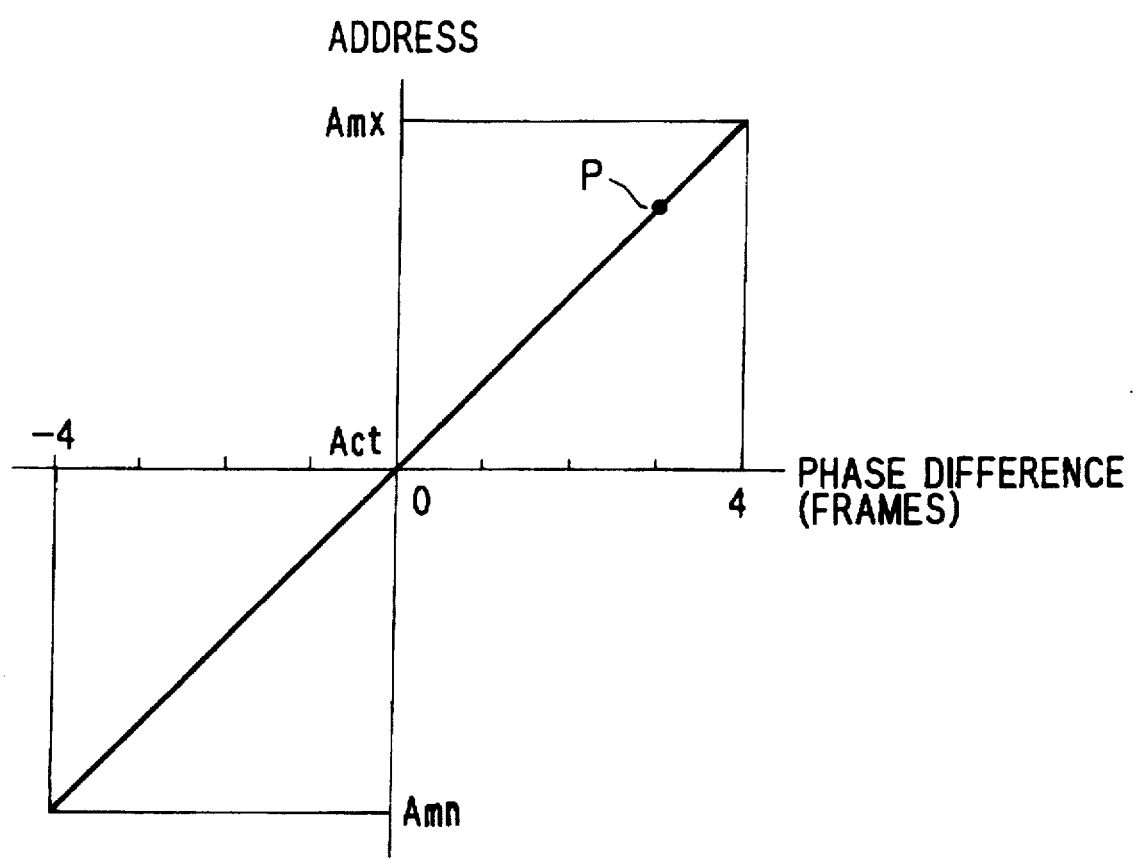
FIG. 6 is a graph showing an address vs. phase difference relationship of a jitter correction memory.

In a state that the spindle servo is locked after the recording/reproduction apparatus was started in the reproduction mode, the PLL circuit of the clock reproduction circuit 75 is also locked. However, since the jitter correction circuit 70 is locked for each EFM frame as described above, it is not always the case that the difference between the relative write address and the relative read address of the RAM 71 is approximated to the zero-frame (EFM frame) state. For example, as indicated by point P in FIG. 6, approximation may be attained with a positive or negative shift from the zero-frame state.

However, in the embodiment of FIG. 1, as described above, at a time point when the spindle servo is locked, the reset signal Srs is supplied from the system controller 20 to the load terminal of the counter 72 via the OR gate 77, the counter value of the counter 72 is reset, and the count value of the counter 73 is loaded into the counter 72.

As a result, the count value of the counter 72 is forcibly equalized to the count value of reference clocks of the counter 73; that is, the difference between the count values of the counters 72 and 73 becomes zero. In other words, the reproduction signal write address and read address of the RAM 71 are reset to the same center value Act (see FIG. 6), to obtain the maximum address margin.

In the reproduction mode of the recording/reproduction apparatus subsequent to the its start, the frame difference detection circuit 76 of the jitter correction circuit 70 always compares the count values of the counters 72 and 73. When the rotation speed of the disc 1B is varied due to, for instance, disturbance, the frame difference detection circuit 76 produces no detection output if the difference between the two count values is smaller than a predetermined value corresponding to, for instance, a difference of four frames of the reproduction signal. In this case, jitters in the reproduction signal are corrected while the reproduction signal writing and reading operations on the RAM 71 is continued.

When disturbance causes the difference between the count values of the counters 72 and 73 to exceed the predetermined value corresponding to the difference of four frames of the reproduction signal, the detection output of the frame difference detection circuit 76 is supplied to the load terminal of the counter 72 via the OR gate 77. As in the above case where the reset signal Srs is supplied to the load terminal, the count value of the counter 72 is forcibly equalized to the count value of reference clocks of the counter 73. Thus, the maximum address margin is obtained.

Although the above embodiment is directed to the case where the invention is applied to the mini disk recording/reproduction apparatus, the invention can be applied to any disc recording/reproduction apparatus in which the servo reference signal taken from a disc of the spindle servo circuit and the jitter correction subject signal of the jitter correction circuit are independent of each other.

What is claimed is:

1. A disc recording/reproduction apparatus for recording and reproducing data onto and from a disc on which control information is written in advance, comprising:
    a spindle servo circuit for controlling, based on the control information taken from the disc, rotation of a spindle motor that drives the disc;
    a memory to and from which reproduction digital data is written and read;
    an address control circuit for generating a write address of the memory by counting clocks synchronized with the reproduction digital data by a first counter, and for generating a read address of the memory by counting reference clocks by a second counter;
    a jitter correction circuit for producing jitter-removed reproduction digital data from the memory; and
    reset means for resetting the address control circuit so as to maximize an address margin of the memory when the spindle servo circuit changes from an unlocked state to a locked state.

2. The disc recording/reproduction apparatus according to claim 1, wherein the reset means resets the first and second counters when a difference between the write address and the read address of the memory exceeds a predetermined value.

3. The disc recording/reproduction apparatus according to claim 2, wherein spindle servo circuit controls the spindle motor so that the disc is rotated at a constant linear velocity.

4. The disc recording/reproduction apparatus according to claim 3, wherein the spindle servo circuit performs rough spindle servo in a first control mode and normal spindle servo in a second control mode after completion of the first control mode.

5. The disc recording/reproduction apparatus according to claim 4, wherein a judgment of the completion of the first control mode is made based on whether a phase-locked loop of the clocks has been locked.

6. The disc recording/reproduction apparatus according to claim 5, wherein a judgment of completion of the second control mode is made based on whether the spindle servo circuit has been locked.

7. A recording/reproduction method for recording and reproducing data onto and from a disc on which control information is written in advance, comprising the steps of:
    controlling, based on the control information taken from the disc, a spindle servo circuit of a spindle motor that drives the disc;
    generating a write address of a memory to and from which reproduction digital data is written and read by counting clocks synchronized with the reproduction digital data by a first counter, and a read address of the memory by counting reference clocks by a second counter;
    correcting jitters by producing jitter-removed reproduction digital data from the memory; and
    resetting the address control so as to maximize an address margin of the memory when the spindle servo circuit changes from an unlocked state to a locked state.

8. The disc recording/reproduction method according to claim 7, further comprising the step of resetting the first and second counters when a difference between the write address and the read address of the memory exceeds a predetermined value.

9. The disc recording/reproduction method according to claim 8, further comprising the step of controlling the spindle servo circuit so that the disc is rotated at a constant linear velocity.

10. The disc recording/reproduction method according to claim 9, further comprising the step of operating in a first control mode, wherein the spindle servo comprises rough spindle servo and operating in a second control mode after completion of the first control mode, wherein the spindle servo comprises normal spindle servo.

11. The disc recording/reproduction method according to claim 10, further comprising the step of determining whether the first control mode is completed based on whether a phase-locked loop of the clocks has been locked.

12. The disc recording/reproduction method according to claim 11, further comprising the step of determining whether the second control mode is completed based on whether the spindle servo circuit has been locked.

13. A disc recording/reproducing apparatus for recording or reproducing data onto or from a disc on which address information is recorded in advance, comprising:
    reproducing means for reproducing signals recorded on the disc as a reproduced signal;
    address information extraction means for extracting the address information from the reproduced signal;
    clock extraction means for extracting a clock component from the reproduced signal;
    memory means for temporarily storing the reproduced signal;
    spindle servo means for controlling a rotation speed of the disc in accordance with the extracted address information;
    reference clock generating means for generating a reference clock;
    memory control means for controlling a write address to the memory means and a read address from the memory means, and including counter means for counting the extracted clock component from the clock extraction means;

address generating means for generating a write address to the memory means in accordance with the extracted clock components counted by the counter means and a read address of the memory means in accordance with the reference clock; and reset means for resetting the counter means so as to maximize an address margin of the memory means when the spindle servo means changes from an unlocked state to a locked state.

14. A disc recording/reproduction apparatus for recording and reproducing data onto and from a disc on which control information is written in advance, comprising:

a spindle servo circuit for controlling, based on the control information taken from the disc, rotation of a spindle motor that drives the disc;

a memory to and from which reproduction digital data is written and read;

an address control circuit for generating a write address of the memory by counting clocks synchronized with the reproduction digital data by a first counter, and for generating a read address of the memory by counting reference clocks by a second counter;

a jitter correction circuit for producing jitter-removed reproduction digital data from the memory; and reset means for resetting the address control circuit so that the write address of the memory and the read address of the memory are reset to a same value so as to maximize an address margin of the memory when the spindle servo circuit changes from an unlocked state to a locked state.

* * * * *